(12) United States Patent
Goddard Rosa

(10) Patent No.: US 11,997,424 B2
(45) Date of Patent: *May 28, 2024

(54) STREAMING A VIDEO CHAT FROM A MOBILE DEVICE TO A DISPLAY DEVICE USING A ROTATING BASE

(71) Applicant: ROKU, INC., San Jose, CA (US)

(72) Inventor: Andre Goddard Rosa, Leander, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,110

(22) Filed: Jan. 20, 2023

(65) Prior Publication Data

US 2023/0156151 A1 May 18, 2023

Related U.S. Application Data

(63) Continuation of application No. 17/518,785, filed on Nov. 4, 2021, now Pat. No. 11,589,004, which is a (Continued)

(51) Int. Cl.
*H04N 7/14* (2006.01)
*H04N 7/01* (2006.01)

(52) U.S. Cl.
CPC .............. *H04N 7/147* (2013.01); *H04N 7/01* (2013.01); *H04N 7/142* (2013.01); *H04N 2007/145* (2013.01)

(58) Field of Classification Search
CPC .. H04N 7/01; H04N 21/4398; H04N 21/4122; H04N 21/440263; H04N 21/41407; H04N 7/142; H04N 21/4788; H04N 7/147; H04N 7/15; H04N 2007/145; H04N 21/4131
(Continued)

(56) References Cited

U.S. PATENT DOCUMENTS 11,178,357 B1 11/2021 Goddard Rosa
11,589,004 B2 2/2023 Rosa
(Continued)

FOREIGN PATENT DOCUMENTS

WO WO 2019/236728 A1 12/2019

OTHER PUBLICATIONS

International Search Report and Written Opinion of the International Searching Authority directed to related International Patent Application No. PCT/US2021/051554, mailed Jan. 7, 2022; 10 pages.

*Primary Examiner* — Phung-Hoang J Nguyen
(74) *Attorney, Agent, or Firm* — Sterne, Kessler, Goldstein & Fox P.L.L.C.

(57) ABSTRACT

Provided herein are system, apparatus, device, method and/or computer program product embodiments, and/or combinations and sub-combinations thereof, for streaming a video chat from a mobile device on a display device. In a given embodiment, a first mobile device and second video device can communicate audio and video data to one another, via a video chat. The incoming audio and video data for the first mobile device can be streamed to and output by an external display device. The streaming request is generated in response to the first mobile device coupling with a rotating base, controlled by the first mobile device.

28 Claims, 7 Drawing Sheets

Related U.S. Application Data continuation of application No. 17/028,561, filed on Sep. 22, 2020, now Pat. No. 11,178,357.

(58) Field of Classification Search
 USPC .......................................... 348/14.01–14.16
 See application file for complete search history.

(56) References Cited

U.S. PATENT DOCUMENTS

| | | |
|---|---|---|
| 2010/0250252 A1 | 9/2010 | Yasoshima |
| 2012/0081504 A1 | 4/2012 | Ng et al. |
| 2013/0141519 A1 | 6/2013 | Sayeed et al. |
| 2013/0321648 A1 | 12/2013 | Tamiya et al. |
| 2014/0320584 A1 | 10/2014 | Kumar |
| 2015/0195489 A1 | 7/2015 | Sobti et al. |
| 2017/0237986 A1 | 8/2017 | Choi et al. |
| 2018/0054561 A1* | 2/2018 | Morita .............. H04M 1/72412 |
| 2018/0063477 A1* | 3/2018 | Yu ............................ H04N 7/15 |
| 2019/0313057 A1 | 10/2019 | Jiang et al. |
| 2020/0358628 A1* | 11/2020 | Achyuth ............... H04M 3/568 |
| 2021/0359872 A1 | 11/2021 | Deole et al. |
| 2022/0094879 A1 | 3/2022 | Goddard Rosa |

* cited by examiner

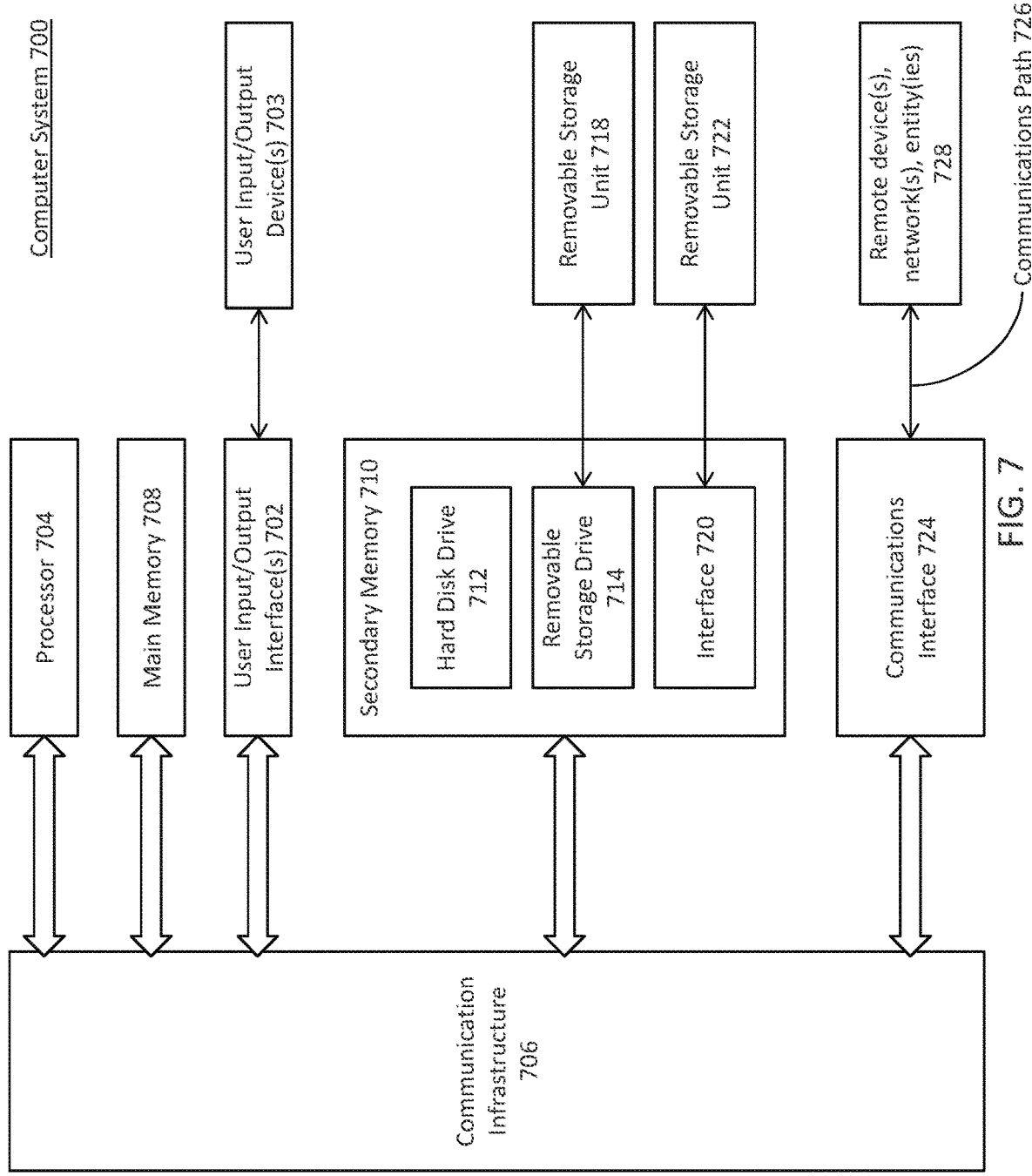

STREAMING A VIDEO CHAT FROM A MOBILE DEVICE TO A DISPLAY DEVICE USING A ROTATING BASE

CROSS-REFERENCE TO RELATED APPLICATIONS

This application is a continuation of U.S. patent application Ser. No. 17/518,785, filed on Nov. 4, 2021, which is a continuation of U.S. patent application Ser. No. 17/028,561, filed on Sep. 22, 2020, now U.S. Pat. No. 11,178,357, the contents of which are incorporated herein by reference in their entireties.

BACKGROUND

Technical Field

This disclosure is generally directed to streaming video and audio data to a display device.

Background

Users use mobile devices such as smartphones, laptops, tablets, and the like to video chat with their family and friends. However, the screens of mobile devices are often too small for this purpose. For example, in the event a user is attempting to video chat with their family, the user can find it difficult to view all their family members in a small display of a mobile device. Conventional systems do not provide the capability of seamlessly connecting the mobile device to a larger display device to stream the video chat. Therefore, the process of connecting the mobile device to a larger display device can be cumbersome.

SUMMARY

Provided herein are system, apparatus, device, method and/or computer program product embodiments, and/or combinations and sub-combinations thereof, for streaming a video chat from a mobile device on a display device.

A given embodiment includes a method for streaming a video chat from a mobile device on a display device. The method may operate by receiving a streaming request to stream incoming audio and video data received by a first mobile device from a second mobile device on a display device, from the first mobile device, and establishing a connection with the display device. The method can further operate by capturing the incoming audio and video data transmitted by the second mobile device to the first mobile device, formatting the incoming audio and video data to be output by the display device and streaming the incoming formatted audio and video data to the display device. The display device outputs the incoming formatted audio and video data in response to receiving the incoming formatted audio and video data.

Another embodiment includes a system for streaming a video chat from a mobile device from a mobile device to a display device. The system includes a camera, a microphone, and a first mobile device coupled to the camera and microphone. The first mobile device is configured to execute an application. The application, when executed, is configured to transmit a chat request for initiating an audio and video chat with a second mobile device. Initiation of the audio and video chat enables the first mobile device to transmit and receive audio and video communication to and from the second mobile device. The application is further configured to establish a connection between the first mobile device and a rotating base and transmit a streaming request to stream incoming audio and video data received by the first mobile device from the second mobile device to a display device, in response to establishing a connection with the rotating base. The incoming audio and video data is output by the display device in response to transmitting the streaming request. The application is further configured to capture outgoing audio and video data from the microphone and camera of the first mobile device and transmit the outgoing audio and video data to the second mobile device.

A further embodiment includes a rotating base. The rotating base includes a motor, a communications device, a rotatable unit coupled to the motor, a coupling unit coupled to the rotatable unit, and a controller coupled to the motor and the communications device. The controller is configured to establish a connection with a mobile device using the communications device in response to the mobile device transmitting a request to connect with the rotating base and receive the mobile device in the coupling unit. The mobile device is communicatively coupled to the rotating base using the communications device and physically coupled to the rotating base using the coupling unit. The controller is further configured to receive instructions to move the rotatable unit a predetermined amount from an application executing on the mobile device and instruct the motor to rotate the rotatable unit the predetermined amount. Rotating the rotatable unit causes the coupling unit, which is physically coupled to the mobile device, to rotate the predetermined amount.

A further embodiment includes a tangible computer-readable device having instructions stored thereon that, when executed by at least one computing device, causes the at least one computing device to perform operations. The operations may include receiving a streaming request to stream incoming audio and video data received by a first mobile device from a second mobile device on a display device, from the first mobile device, and establishing a connection with the display device. The operations further include capturing the incoming audio and video data transmitted by the second mobile device to the first mobile device, formatting the incoming audio and video data to be output by the display device, and streaming the incoming formatted audio and video data to the display device. The display device outputs the incoming formatted audio and video data in response to receiving the incoming formatted audio and video data.

BRIEF DESCRIPTION OF THE DRAWINGS

The accompanying drawings are incorporated herein and form a part of the specification.

FIG. 7 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
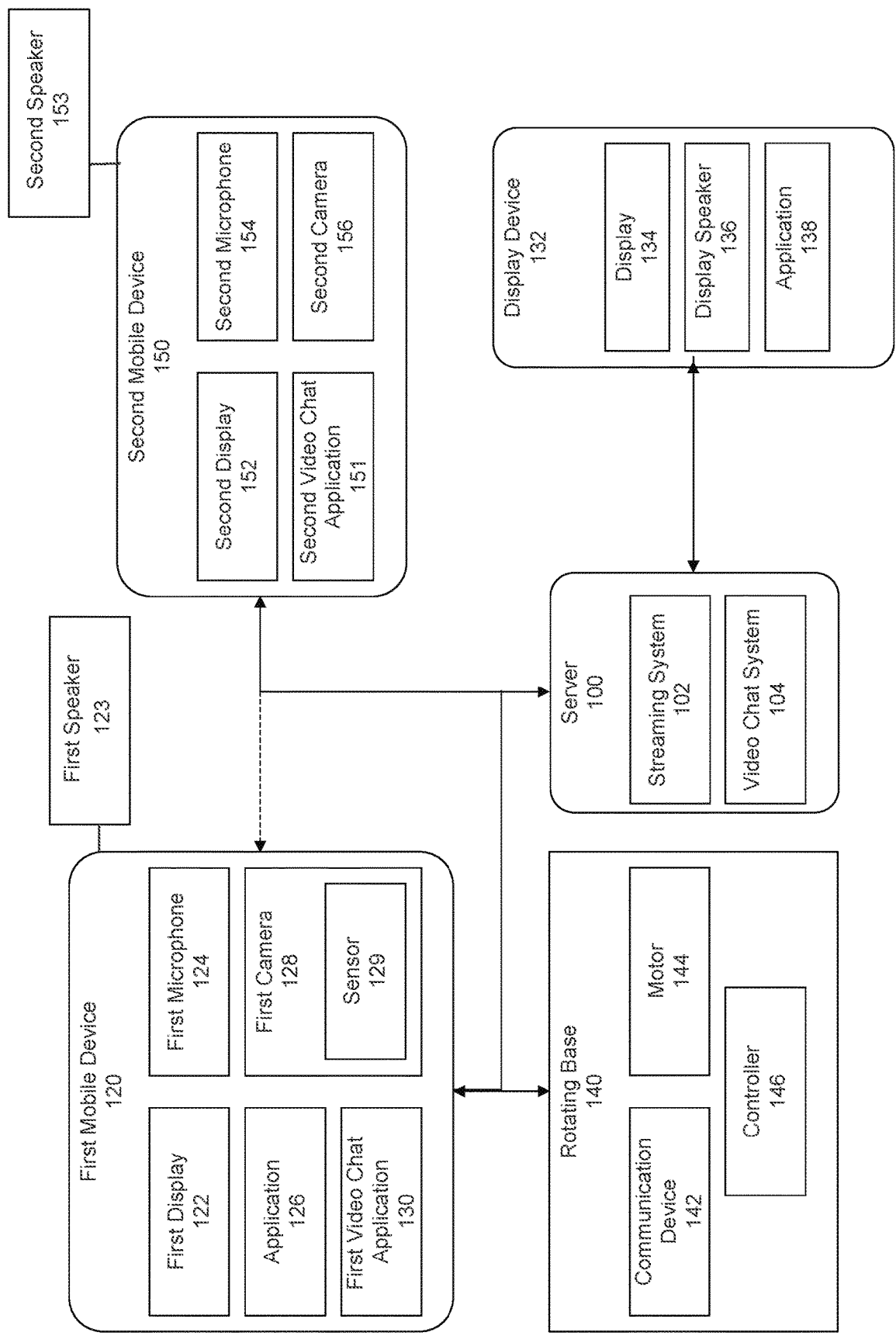
FIG. 1 is a block diagram of a system for streaming a video chat from a mobile device to a display device, according to some embodiments.

Provided herein are system, apparatus, device, method and/or computer program product embodiments, and/or combinations and sub-combinations thereof, for streaming a video chat from a mobile device on a display device.

As indicated above, a user can desire to view a display of a video chat on a larger display device. As such, the user can desire to stream the display of the video chat on a larger display. Conventional methods for attaching a display device to a mobile device are cumbersome and complicated.

In a given embodiment, a first user can use a first mobile device to transmit a video chat request to a server to initiate a video chat with a second user using a second mobile device. The server can enable communication between the first and second mobile devices in response to receiving the video request. The communication can include audio and video data. The audio data can be received through the microphones of the first and second mobile devices, and the video data can be received through the cameras of the first and second video devices.

The first user can couple the first mobile device to a rotating base to stream the video chat on a display device, such as a television. The rotating base can include a rotatable unit coupled to a coupling unit, a motor coupled to the rotatable unit, and a controller coupled to the motor. The rotating base can also include a communication device coupled to the controller. The mobile device can be communicatively coupled to the rotating base using the communication device. Furthermore, the mobile device can be physically coupled to the rotating device using the coupling unit. In response to the first mobile device being communicatively coupled to the rotating base, a streaming request can be transmitted to the server. The server can form a connection between the display device and the first mobile device. The incoming audio and video data received by the first mobile device can be output by the display device.

An application executing on the first mobile device can use the camera of the first mobile device to determine whether the first mobile device needs to be moved based on the movement of the first user to keep the first user is within the field of view of the camera. The camera of the first mobile device can capture the movement of the first user (e.g., an object) in the field of view of the camera. The application determines an amount that the first mobile device needs to be moved to keep the first user within the field of view. The application transmits an instruction to the rotating base to rotate the rotatable unit the determined amount. In response to receiving the instruction, the controller can instruct the motor to move the rotatable unit by the determined amount. By doing so, the rotatable unit can move the coupling unit holding the first mobile device.

The above configuration allows for seamlessly streaming audio and video data of a video chat on a display device, such as a television, to name just one example. Furthermore, this configuration allows for a hands-free experience while the user is participating in the video chat.

FIG. 1 is a block diagram of a system for streaming a video chat from a mobile device to a display device. In an embodiment, the system can include a server 100, first mobile device 120, display device 132, rotating base 140, and second mobile device 150. Server 100, first mobile device 120, and second mobile device 150 can be connected through wired connections, wireless connections, or a combination of wired and wireless connections. Furthermore, server 100 and display device 132 can be connected through wired connections, wireless connections, or a combination of wired and wireless connections.

As an example, server 100, first mobile device 120, and second mobile device 150 can be connected through a network. Server 100 and display device 132 can also be connected through the network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Rotating base 140 can include communication device 142. First mobile device 120 can be communicatively coupled to communication device 142 of rotating base 140 through a wired or wireless connection. For example, a data cable coupled to a data port of first mobile device 120 can be connected to communication device 142. In some embodiments, communications device 142 can be a Near Field Communication (NFC) device, such as a Bluetooth® device. Therefore, first mobile device 120 can be wirelessly coupled to communication device 142.

Server 100 can include streaming system 102 and video chat system 104. Streaming system 102 can be configured to stream incoming video and audio data to display device 132. Video chat system 104 can be configured to facilitate a video chat between first mobile device 120 and second mobile device 150. In this regard, first mobile device 120 and second mobile device 150 can transmit and receive audio and video data to and from one another through video chat system 104.

First mobile device 120 can include a first display 122, first speaker 123, first microphone 124, application 126, first camera 128, and first video chat application 130. First microphone 124 can be configured to receive and capture audio input. First speaker 123 can output audio data. First speaker 123 may be built-in to first mobile device 120 or be external to first mobile device 120. If first speaker 123 is external to first mobile device 120, it may be coupled to first mobile device using a wired or wireless connection. First camera 128 can be configured to receive and capture image data, including still image data and video data. First camera 128 can also include sensor 129. Sensor 129 can be an optical sensor configured to track the movement of an object within the field of view of first camera 128.

First video chat application 130 can be a video chat platform or Voice-over-IP (VOIP) system configured to allow first mobile device 120 to transmit and receive audio and video data to and from another mobile device, such as second mobile device 150. First video chat application 130 can communicate with another mobile device (e.g., second mobile device 150), through video chat system 104. Alternatively, first video chat application 130 can be a third-party video chat platform configured to communicate with the other mobile device using a third-party video chat system, such as Zoom®, WebEX®, GOOGLE Hangouts®, Microsoft Teams®, or the like. Furthermore, first video chat application 130 can be a third-party Voice-over-IP (VoIP), such as Skype®, Messenger®, WhatsApp®, FaceTime®, or the like.

Application 126 can be a streaming application. Application 126 can be configured to transmit a request to server 100 to stream audio and video data of a video chat from first mobile device 120 to display device 132. Display device 132 can output the audio and video data. Application 126 can also be configured to track a user's movement within the field of view of first camera 128, using sensor 129.

Second mobile device 150 can include a second display 152, second speaker 153, second microphone 154, second camera 156, and second video chat application 151. The second microphone 154 can be configured to receive and capture audio input. Second speaker 153 can output audio data. Second speaker 153 may be built-in to second mobile device 150 or be external to second mobile device 150. If second speaker 153 is external to second mobile device 150, it may be coupled to first mobile device using a wired or wireless connection. Second camera 156 can be configured to receive and capture image data, including still image data and video data. Second video chat application 151 can be a video chat platform or Voice-over-IP (VOIP) system configured to allow second mobile device 150 to transmit and receive audio and video data to and from another mobile device, such as first mobile device 120.

Display device 132 can include a display 134, display speaker 136, and application 138. Display 134 can output still and moving image data (e.g., video data). Display speaker 136 can be configured to output audio data. Application 138 can be a streaming application configured to receive audio and video data from first mobile device 120 to be output by display 134 and display speaker 136. Display device 132 can be a television, monitor, projector screen, or the like.

Rotating base 140 can be a base configured to hold, support, and rotate a mobile device (e.g., first mobile device 120). Rotating base 140 can include a rotatable unit, a coupling unit, communication device 142, motor 144, and controller 146. The rotatable unit and coupling unit will be described in further detail with respect to FIG. 2. Controller 146 can be coupled to communication device 142 and motor 144. Furthermore, motor 144 can be coupled to the rotatable unit, and the rotatable unit can be coupled to the coupling unit.

Rotating base 140 can be physically coupled to first mobile device 120 using the coupling unit. The coupling unit can include an attachment mechanism to hold and support first mobile device 120. The attachment mechanism can include clasps, latches, magnets, or the like.

In some embodiments, rotating base 140 can be configured to provide power to first mobile device 120 in response to physically coupling to the first mobile device 120. The power can be provided through a cord forming a connection between rotating base 140 and first mobile device 120. The cord may receive power through a power outlet. Alternatively, the cord may receive power from rotating base 140's or display device 132's power source through a USB port.

In some embodiments, the rotating base 140 or display device 132 may also wirelessly provide power to first mobile device 120 using the Qi Standard.

As described above, the coupling unit can be coupled to the rotatable unit. The rotatable unit can be an arm or ball, configured to rotate around a rotational axis. The rotatable unit can rotate the coupling unit and, in turn, rotate first mobile device 120, which is physically coupled to the coupling unit. The rotatable unit can also traverse along the x-axis and z-axis. Motor 144 can control the operation (e.g., rotation) of the rotating unit.

Rotating base 140 can be communicatively coupled to first mobile device 120 using communication device 142. Communication device 142 can be a data port configured to form a connection with first mobile device using a data cable. Alternatively, communication device 142 can be an NFC device such as a Bluetooth® device, configured to connect with first mobile device 120 wirelessly.

In response to receiving first mobile device 120 being physically and communicatively coupled with rotating base 140, controller 146 can receive instructions from first mobile device 120 to rotate the rotatable unit a predetermined amount. Controller 146 can instruct the motor to rotate the rotatable unit the predetermined amount.

Figure 2:
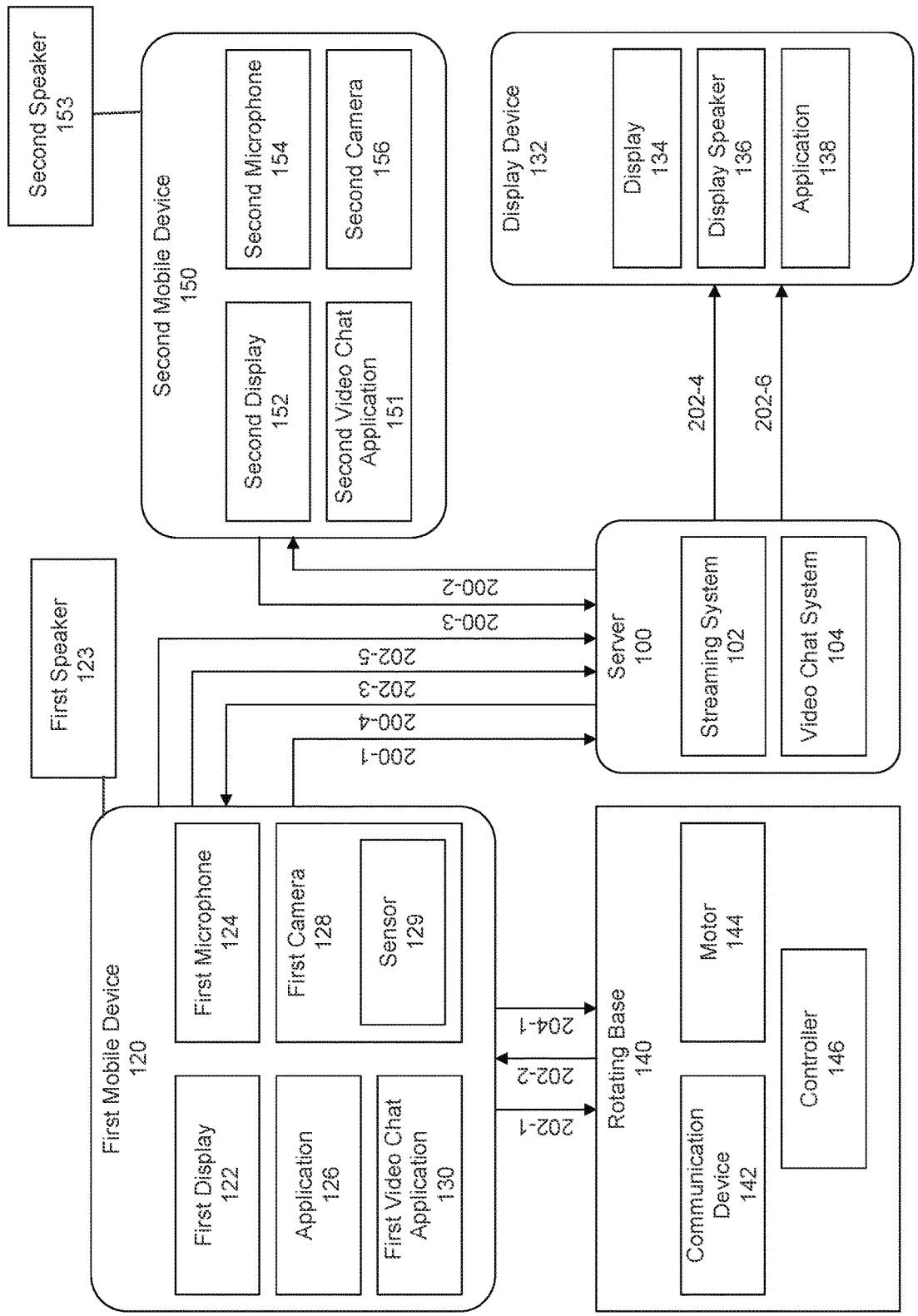
FIG. 2 is a block diagram of data flow in the system for streaming a video chat from a mobile device to a display device, according to some embodiments.

FIG. 2 is a block diagram illustrating a data flow of the system for streaming a video chat from a mobile device to a display device. In a given embodiment, a first user of first mobile device 120 can attempt to initiate a video chat with a second user of second mobile device 150 using first video chat application 130 of first mobile device 120 and second video chat application 151 of second mobile device 150. As an example, first video chat application 130 and first video chat application 130 can be a video chat platform or VoIP platform. In the event first video chat application 130 and second video chat application 151 are VoIP platforms, first video chat application 130 can convert the audio and video data into a digital signal. This way, the audio, and video data can be transmitted over a network.

First mobile device 120 can launch first video chat application 130. First, mobile device 120 can retrieve an identifier associated with second mobile device 150 (e.g., phone number, user identifier, username, screen name, or the like). First mobile device 120 can transmit request 200-1 to video chat system 104 for initiating a video chat with second mobile device 150. Request 200-1 can include the identifier associated with second mobile device 150.

Server 100 can receive request 200-1 and video chat system 104 can identify second mobile device 150 using the identifier in request 200-1. Video chat system 104 can transmit request 200-2 to initiate the video chat with second mobile device 150. Request 200-2 can include an identifier of first mobile device 150.

In response to receiving request 200-2, second mobile device 150 can launch second video chat application 151. Second video chat application 151 can generate an alert indicating that request to initiate a video chat with first mobile device 120. The alert can be audible, haptic, visual, or a combination of both. The second user can accept the request to initiate the video chat by providing an input (e.g., selecting an "accept" button). In response to the second user accepting the request to initiate the video chat, second video chat application 151 can transmit response 200-3 to video chat system 104. Response 200-3 can include an instruction to initiate the video chat with first mobile device 150.

Server 100 can receive response 200-3, and video chat system 104 can generate response 200-4. Response 200-4 can enable audio and video data transmissions between first mobile device 120 and second mobile device 150. Video chat system 104 can transmit response 200-4 to first video chat application 130 of first mobile device 120. In some embodiments, the audio and video transmissions may also allow for screen sharing capabilities. As such, the video data may include image data of a first mobile device 120 or second mobile device 150 corresponding to image data being displayed on first display 122 or second display 152.

At the time the video chat is initiated, first video chat application 130 of first mobile device 120 and second video chat application 151 of second mobile device 150 can negotiate a format for compressing, encoding, decoding, and syncing the outgoing audio and video data. The negotiated format can be a format accepted by first and second mobile devices 120 and 150 as well as the network connection. This way, first video chat application 130 can compress, encode, and sync audio and video in a format that can be decompressed and decoded by second video chat application 151. Similarly, second video chat application 151 can compress, encode, and sync audio and video in a format that can be decompressed and decoded by first video chat application 130. Furthermore, the compression, encoding, decoding, and syncing formats can be updated during the video chat using adaptive streaming based on the network connection, quality of the video, or the like.

In response to receiving response 200-4, first video chat application 130 can make first camera 128 and first microphone 124 operational. First camera 128 can receive and capture outgoing video data within a field of view of first camera 128. First microphone 124 can receive and capture outgoing audio data within a given proximity of first mobile device 120. First video chat application 130 can transmit the captured outgoing video and audio data to second video chat application 151 of second mobile device 150, through video chat system 104.

In some embodiments, first mobile device 120 and second mobile device 150 may form a peer-to-peer connection after the initiation of the video chat. In this regard, first and second mobile devices 120, 150 may directly transmit audio and video data to each other over a network using first and second video chat application 130 and 151.

Second video chat application 151 of second mobile device 150 can receive the incoming audio, and video data from first video chat application 130 of first mobile device 150. Second video chat application 151 can cause display of the incoming video data on second display 152 and output the incoming audio data through a second speaker 153 of second mobile device 150. Speaker 153 can be built-in second mobile device 150 or can be externally connected to second mobile device 150

Second camera 156 can receive and capture outgoing video data within a field of view of second camera 156. Second microphone 154 can receive and capture outgoing audio data within a given proximity of second mobile device 150. Second video chat application 151 can transmit the captured outgoing video and audio data to first video chat application 130 of first mobile device 120 through video chat system 104. As stated above, first and second mobile device 120, 150 may also transmit audio and video communication directly to one another over a peer-to-peer connection.

First video chat application 130 of first mobile device 150 can receive the incoming audio and video data from second video chat application 151 of second mobile device 150. First video chat application 130 can cause display of the incoming video data on first display 122 and output the incoming audio data through a first speaker 123 of first mobile device 120. First speaker 123 can be built-in first mobile device 120 or can be externally connected to first mobile device 120. The audio and video data transmissions and output between first mobile device 120 and second mobile device 150 can be in (near) real-time.

In some embodiments, first video chat application 130 of first mobile device 150 and second video chat application 151 of second mobile device 150 can be a third-party video chat platform, such as Zoom®, CISCO Webex®, GOOGLE Hangouts®, MICROSOFT Teams®, or the like. Alternatively, first video chat application 130 of first mobile device 150 and second video chat application 151 of second mobile device 150 can be a third-party VOIP platform such as SKYPE, MESSENGER, FACETIME or WHATSAPP. In the event, first video chat application 130 of first mobile device 120 and second video chat application 151 of second mobile device 150 are third-party video chat platforms or third-party VoIP platform, first video chat application 130 of first mobile device 150 and second video chat application 151 of second mobile device 150 can communicate through a third-party server.

In some embodiments, first and second mobile device may transmit or stream audio and video data directly to one another using first video chat application 130 and second video chat application 151. That is, first mobile device 120 can launch first video chat application 130. First video chat application 130 may transmit a request to initiate a video chat to second video chat application 151 of second mobile device 150.

In response to receiving the video chat request, second video chat application 151 can generate an alert indicating that request to initiate a video chat with first mobile device 120. In response to the second user accepting the request to initiate the video chat, second video chat application 151 can transmit a response to first video chat application 130 including an instruction to initiate the video chat with first mobile device 150.

At the time the video chat is initiated, first video chat application 130 of first mobile device 120 and second video chat application 151 of second mobile device 150 can negotiate a format for compressing, encoding, decoding, and syncing the outgoing audio and video data. The negotiated format can be a format accepted by first and second mobile devices 120 and 150 as well as the network connection. This way, first video chat application 130 can compress, encode, and sync audio and video in a format that can be decompressed and decoded by second video chat application 151. Similarly, second video chat application 151 can compress, encode, and sync audio and video in a format that can be decompressed and decoded by first video chat application 130. Furthermore, the compression, encoding, decoding, and syncing formats can be updated during the video chat using adaptive streaming based on the network connection, quality of the video, or the like.

First video chat application 130 can make first camera 128 and first microphone 124 operational. First camera 128 can receive and capture outgoing video data within a field of view of first camera 128. First microphone 124 can receive and capture outgoing audio data within a given proximity of first mobile device 120. First video chat application 130 can transmit the captured outgoing video and audio data to second video chat application 151 of second mobile device 150.

Second video chat application 151 of second mobile device 150 can receive the incoming audio, and video data from first video chat application 130 of first mobile device 120. Second video chat application 151 can cause display of the incoming video data on second display 152 and output the incoming audio data through the second speaker 153 of second mobile device 150. The speaker can be built-in second mobile device 150 or can be externally connected to second mobile device 150

Second camera 156 can receive and capture outgoing video data within a field of view of second camera 156. Second microphone 154 can receive and capture outgoing audio data within a given proximity of second mobile device 150. Second video chat application 151 can transmit the captured outgoing video and audio data to first video chat application 130 of first mobile device 120 through video chat system 104.

First video chat application 130 of first mobile device 120 can receive the incoming audio and video data from second video chat application 151 of second mobile device 150. Second video chat application 151 can cause display of the incoming video data on first display 122 and output the incoming audio data through first speaker 123 of first mobile device 120. The speaker can be built-in first mobile device 120 or can be externally connected to first mobile device 120. The audio and video data transmissions and output between first mobile device 120 and second mobile device 150 can be in (near) real-time The first user can desire to view the incoming video data on display device 132. As indicated above, display device 132 can be a television, monitor, projection screen, or the like. First mobile device 120 can transmit request 202-1 to rotating base 140 to communicatively couple with rotating base 140. In some embodiments, request 202-1 can be generated in response to forming a connection with rotating base 140 by inserting one end of a data cable in a data port of first mobile device 120 and inserting the other end of the data cable in a data port of rotating base 140. The data port of rotating base 140 can be communication device 142 of rotating base 140. In other embodiments, request 202-1 can be generated in response to wirelessly connecting to communication device 142 of rotating base 140.

In response to receiving request 202-1, rotating base 140 can generate response 202-2. Response 202-2 can include an instruction for first mobile device 120 to launch application 126 and transmit a request through application 126 to stream the audio and video data being received by first mobile device 120 to display device 132. Rotating base 140 can transmit response 202-2 to first mobile device 120.

As indicated above, communications device 142 can be an NFC device. First mobile device 120 can be connected with communications device 142 using wireless radio waves. For example, request 202-1 can be a request to pair with communications device 142. Request 202-1 can include an identifier of first mobile device 120 (e.g., MAC address, phone number, IMEI number, or the like). Rotating base 140 can confirm the identifier of first mobile device 120 and confirm the request to pair with first mobile device 120. The confirmation can be transmitted in response 202-2. Request 202-1 and response 202-2 can form an electronic handshake.

In response to receiving response 202-2, first mobile device 120 can launch application 126. Application 126 can transmit request 202-3 to server 100. Request 202-3 can include a request to stream the audio and video data received by first mobile device 120 to display device 132. Request 202-3 can include an identifier of display device 132. The identifier can be a MAC address.

In response to receiving request 202-3, streaming system 102 can transmit request 202-4 to display device 132. Request 202-4 can be a request to form a connection with display device 132. Request 202-4 can include the identifier of display device 132, an identifier of server 100, and an identifier of first mobile device 120. In response to receiving request 202-4 application 138 of display device 132 can initiate a connection with server 100 and transmit a confirmation of initiation of the connection. The connection can also initiate a session that allows server 100 to transmit streams of video and audio data to display device 132. The connection can allow streaming system 102, to stream video and audio data to display device 132 to be output by display 134 and display speaker 136.

In some embodiments, streaming system 102 can receive a stream 202-5 of incoming audio and video data received by first mobile device 120. The incoming audio and video data can be received by first mobile device 120 from second mobile device 150 as part of the video chat, through video chat system 104 or a third-party server. The audio and video data in stream 202-5 can be encoded, synced, and ready to be output. Alternatively, streaming system 102 can capture incoming audio and video data being transmitted through video chat application 104, from second mobile device 150, before it's been received by first mobile device 120. Therefore, streaming system 102 can encode, sync, and format the incoming audio and video data. Furthermore, streaming system 102 can format the incoming audio and video data to transmit the incoming audio and video data via a streaming protocol.

A streaming protocol governs how incoming audio and video data can be transmitted to display device 132 over the network. The streaming protocol can be Transmission Control Protocol (TCP), User Datagram Protocol (UDP), HTTP, HDS, MPEG-DASH, RTSP, RTP, RTCP, SCTP (Stream Control Transmission Protocol), and RTMP. Streaming system 102 can transmit stream 202-6 to display device 132. Stream 202-6 can include encoded, synced, and incoming formatted audio and video data to be output by display device 132. Streaming system 102 can transmit the incoming audio and video data in chunks in stream 202-6. The incoming audio and video data can need to be reassembled at display device 132.

In some embodiments, display device 132 may display the same stream received through 202-6. Stream 202-6 may be transmitted as a pass-through. In other embodiments, stream 202-6 may be a transport stream such as MPEG or DASH. The transport stream may include chunks of audio and video data encoded or transcoded in formats such as AAC, AC3, HEVC, MPEG4.

In some embodiments, streaming system 102 and display device 132 can negotiate encoding, decoding, and syncing formats at the time when the connection is formed. The negotiated format can be determined based on formats accepted by first mobile device 120, second mobile device 150, and display device 132 as well as the network connection. For example, second video chat application 151 of second mobile device 150 can compress, encode, and sync outgoing audio and video data in a predetermined format. The outgoing audio and video data can be transmitted to first mobile device 120 via video chat system 104. Streaming system 102 can receive compressed, encoded, and synced incoming audio and video data from first mobile device 120. In particular, the compressed, encoded, and synced incoming audio and video data can be in a format supported by first and second mobile devices 120 and 150. Streaming system 102 can format the incoming audio and video data so that the audio and video data is compressed, encoded, and synced in a format accepted by display device 132. The format can be the format agreed upon when forming the connection with server 100. Furthermore, the compression, encoding, decoding, and syncing formats can be updated during the video chat using adaptive streaming based on the network connection, quality of the video, or the like.

Display device 132 can receive stream 202-6. Application 138 of display device 132 can format the incoming video data to be output on display 134. For example, application 138 can format the size, resolution, color, brightness, or the like, of the incoming video data, based on the settings of display 134. Application 138 can also reassemble the incoming audio and video data when received in chunks in stream 202-6. Application 138 can also format the incoming audio data to be output by display speaker 136. Application 138 can cause display of the incoming video data on display 134 and cause the output of the incoming audio data through display speaker 136.

Stream 202-5 and 202-6 can provide a continuous flow of incoming audio and video data, as received by first mobile device 120 from second mobile device 150, during the video chat. This way, display device 132 can output the incoming audio and video data in (near) real-time. In some embodiments, first mobile device 120 can output the incoming audio and video data while display device 132 is also outputting the audio and video data concurrently.

In some embodiments, stream 202-5 and 202-6 can also include outgoing video data captured by first camera 128. Display device 132 can display the incoming video data as well as the outgoing video data. For example, the incoming video data can be displayed on display 134 as an expanded display, while the outgoing video data can be a smaller display.

In some embodiments, in the event first and second mobile devices 120 and 150 transmitting audio and video directly to one another using first and second video chat application 130 and 151, application 126 can transmit a request to first video chat application 131 to stream the incoming audio and video data received by first mobile device 120 to display device 132. Furthermore, display device 132 may be communicatively coupled with first mobile device 120. Specifically, display device 132 may be coupled to first mobile device 120 through a wired or wireless connection. As a result, in response to receiving the request to stream the incoming audio and video data to display device 132, first video chat application 130 can encode, sync, and format the incoming audio and video data. Furthermore, first video chat application 130 can format the incoming audio and video data to transmit the incoming audio and video data via a streaming protocol. Furthermore, first video chat application 130 may directly transmit or stream the incoming audio and video data to display device 132 over the wired or wireless connection using the streaming techniques described above. Application 138 may receive the audio and video data from first video chat application 130. Display device 132 may output the video data using display 134 and the audio data using display speaker 136.

In some embodiments, application 126 may be incorporated in first video chat application 130. As such, in response to receiving response 202-2, first video chat application 130 may form a connection with display device 132 and stream the incoming audio and video data received by first mobile device 120 to display device 132 using the streaming techniques described above.

First mobile device 120 can also be physically coupled to a coupling unit of rotating base 140. Furthermore, application 126 can be configured to track the movement of an object within the field of view of first camera 128, using sensor 129. Sensor 129 can be an optical sensor configured to track movements of the object within the field of view of first camera 128. The object can be the first user. As an example, first camera 128 can be configured to capture a physical scene within the field of view of first camera 128. Sensor 129 can identify various objects within the physical scene. As first mobile device 120 moves, the field of view of first camera 128 can change, and in turn, the objects within the field of view can change. Sensor 129 can generate outlines around the edges of each detected object within the field of view.

In some embodiments, application 126 can identify an object out of multiple objects as the person speaking. For example, application 126 can detect whether a user is speaking based on the audio of the user received by first microphone 124. Application 126 may instruct the first camera 128 to follow the user who is speaking, until the user stops speaking. In some embodiments, application 126 may implement image recognition technology to detect a user from multiple objects.

Application 126 may also control a zoom or panning functionality of first camera 128 based on the audio of the user received by first microphone 124. For example, application 126 may zoom into the user if the user is the only object producing audio within the field of view of first camera 128. However, if other audio is detected from another user or object, application 126 may instruct first camera 128 to zoom out to capture both the other user or object.

Application 126 may also use machine-learning algorithms to control the zoom or pan functionality. For example, application 126 may use natural language processing (NLP) to understand when a user speaking is addressing other people within the same room. In response to determining the user is addressing other people within the same room, application 126 may control the zoom functionality of first camera 128 to capture the other people in the same room.

In some embodiments, application 126 may use machine-learning algorithms to identify a main presenter or user, based on the amount a presenter, or user is speaking. In this regard, while other people may speak, application 126 may instruct first camera 128 to keep the main presenter or user in the field of view or in-focus.

In some embodiments, application 126 may instruct first camera 128 to zoom and pan as part of a scripted pattern. For example, application 126 may instruct first camera 128 to zoom out every 20 minutes and zoom in every 10 minutes.

As a non-limiting example, application 126 can use a real-time computer vision application, such as OpenCV, to track objects in the field of view of first camera 128. Real-time computer visions can use the real-time image being captured by first camera 128 to track an object, such as a first user within the field of view of the camera. The real-time computer vision application can be configured to perform object video tracking and object recognition. In particular, the real-time computer vision application can use target representation and localization, and filtering and data association to identify the first user in the field of view of the camera. Target representation and localization can include locating and tracking a moving object (e.g., first user) within the field of view of first camera 128. The real-time computer vision application can use kernel-based tracking or contour tracking to implement target representation and localization. Furthermore, the real-time computer vision application can use edge detection to identify the first user in the field of view of first camera 128. Once identified, the real-time computer vision application can track the first user, as the first user moves within the field of view of first camera 128.

Application 126 can distinguish the first user from the detected objects. For example, while first mobile device 120 is physically coupled to the coupling unit of rotating base 140, and the first user is providing audio input (e.g., speaking), which is being captured by first microphone 124, application 126 can recognize the first user from the detected objects. Application 126 can assign identifiers to all the detected objects. Application 126 can receive movement data of the detected objects from sensor 129. The movement data can be an amount an object as moved and an identifier of the detected object.

The first user can move in all directions with respect to rotating base 140 and first mobile device 120. For example, the movements can include but are not limited to a combination of, up or down, and left or right of rotating base 140 and first mobile device 120, behind rotating base 140 and first mobile device 120, farther away from rotating base 140 and first mobile device 120, and closer to rotating base 140 and first mobile device 120. Therefore, the movement data can include the first user's location with respect to first camera 128.

Application 126 can determine that the first user has moved more than a given amount, such that the first user is no longer in focus within the field of view of first camera 128, based on the movement data received from sensor 129. Application 126 can transmit request 204-1 to rotating base 140 to move the rotatable unit of rotating base 140 the given amount so that the first user is in focus within the field of view of the first camera 128.

In response to receiving request 204-1, controller 146 of rotating base 140 can instruct motor 144 to rotate the rotatable unit the given amount, so that the first user is in focus within the field of view of the first camera 128. By rotating the rotatable unit, the motor also rotates the coupling unit, which supports and holds first mobile device 120.

In some embodiments, the first user can be continuously moving for a period of time and, therefore, continuously moving out of focus from the field of view of first camera 128. Application 128 can recalculate a given amount to move the rotatable unit to keep the first user in focus in the field of view of first camera 128, each time the first user moves more than a threshold amount. In this regard, request 204-1 can continuously provide updated instructions to move the rotatable unit a given amount to rotating base 140. Controller 146 can instruct the motor to rotate the rotatable unit the given amount based on the updated instructions.

In some embodiments, application 126 can control the zoom of first camera 128. The zoom functionality may be made up of a combination of algorithms, such as optical zoom using the camera lenses, or digital zoom by applying imaging algorithms and by cropping the image within the field of view of first camera 128. For example, if the first user moves farther away from first camera 128, the first user can still be within the center of the field of view of the camera; however, it can be out of focus. As such, application 126 can determine an amount to adjust the zoom to bring the first user into focus. Application 126 can control the operation of the zoom of first camera 128 to bring the first user into focus.

Figure 3:
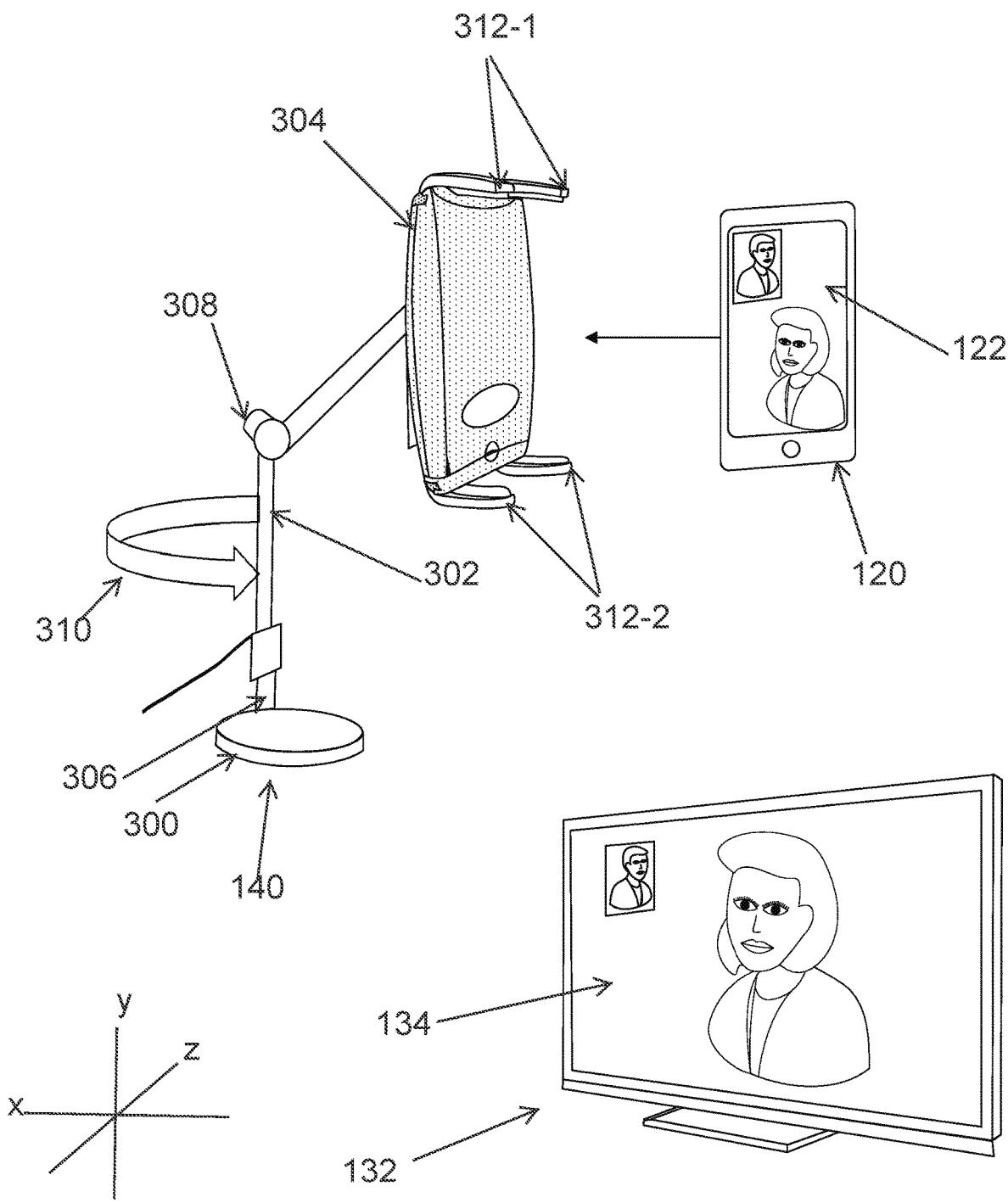
FIG. 3 is a block diagram of a rotatable base, according to example embodiments.

FIG. 3 is a block diagram illustrating an example rotating base and display device, according to example embodiments. In a given embodiment, rotating base 140 can include a base 300, a rotatable unit 302, and a coupling unit 304. Base 300 can be coupled to rotatable unit 302, and rotatable unit 302 can be coupled to coupling unit 304.

Base 300 can be disposed at a first end of rotating base 140 and can be configured to support rotatable unit 302 and coupling unit 304 and keep rotatable unit 302 and coupling unit 304 upright. An interior of base 300 can include a controller (e.g., controller 146 as shown in FIG. 1), motor (e.g., motor 144 as shown in FIG. 1), and communication device (e.g., communication device 142 as shown in FIG. 1). The interior of base 300 can also include a power supply to power the controller, motor, and communication device.

Rotatable unit 302 can include a first hinge 306 and a second hinge 308. Rotatable unit can be coupled to base 300 at the first hinge 306. The motor can control rotatable unit 302 to rotate around first hinge 306. First hinge 306 can be represented by rotational axis 310. The motor can also cause the rotatable unit 302 to traverse along second hinge 308. The x and y-axis can represent the second hinge 308. Rotatable unit 302 can be shaped like an arm. However, rotatable unit 302 can be in any shape, and it can be with or without hinges, as long as rotatable unit 302 is configured to rotate about rotational axis 310 and traverse along the x, y, and z-axes.

Coupling unit 304 can be connected to rotatable unit 302 at a second end of rotatable base 140. Coupling unit 304 can include clasps 312-1 and 312-2 to hold and support first mobile device 120. Clasps 312-1 and 312-2 can be the attachment mechanisms to attach the first mobile device 120 to coupling unit 304. Clasps 312-1 and 312-2 can expand or contract to hold and support mobile devices of various sizes. While the attachment mechanisms of coupling unit 304 are clasps 312-1 and 312-2, attachment mechanisms can also include a magnet, horizontal clasps, adhesive material, clips, or the like.

In a given embodiment, the controller can receive instructions from the server (e.g., server 100, as shown in FIG. 1) to move rotatable unit 302 a given amount. The controller can determine an amount the rotatable unit 302 needs to be rotated around first hinge 306, and an amount rotatable unit 302 needs to traverse along second hinge 308, based on the given amount. The controller can instruct the motor to rotate rotatable unit 302 and to cause the rotatable unit 302 to traverse along second hinge 308 based on the determined amounts. The motor can rotate rotatable unit 302 around first hinge 306 or cause rotatable unit to traverse along second hinge 308 based on the controller's instructions. Rotating rotatable unit 302 and causing rotatable unit 302 to traverse along second hinge 308 can cause coupling unit 304 to rotate and traverse along second hinge 308.

First display 122 of first mobile device 120 can output video data corresponding to a video chat as well as video data being captured by the camera (e.g., first camera 128 as shown in FIG. 1) of first mobile device 120. Display 134 can also output video data corresponding to the video chat, as well as the video data being captured by the camera of the mobile device 120.

In some embodiments, rotatable base 140 may be a clip or clamp that may be attached to the display device such as a television or may also be attached to a support structure such as a wall.

Figure 4:
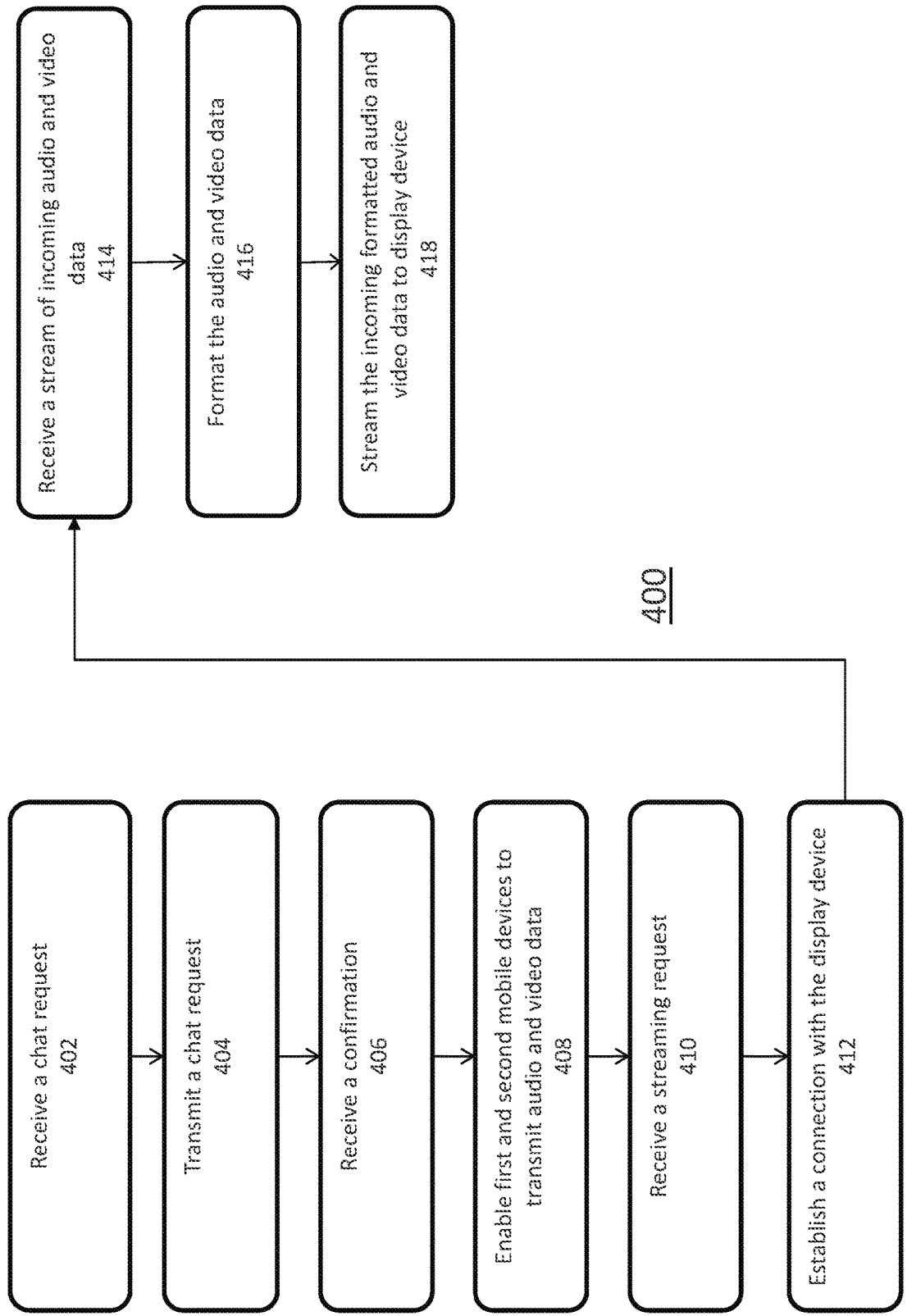
FIG. 4 is a flowchart illustrating a process for streaming a video chat on a display device, according to some embodiments.

FIG. 4 is a flowchart illustrating a process for streaming audio and video data from a mobile device to a display device, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, server 100 receives a chat request from first mobile device 120 to initiate an audio and video chat with second mobile device 150. The chat request can be transmitted from first video chat application 130 of first mobile device 120. The chat request can include a unique identifier of second mobile device 150. The unique identifier can be a phone number, username, MAC address, or the like. A first user can operate first mobile device 120, and a second user can operate second mobile device 150.

In 404, video chat system 104 transmits a chat request to second mobile device 150. The chat request can include a request from first mobile device 120 to initiate an audio and video chat. The chat request can be transmitted to second video chat application 151 of second mobile device 150. Second mobile device 150 can generate a combination of an audio, haptic, and visual alert, in response to receiving the chat request.

In 406, server 100 can receive a confirmation from second video chat application 151 of second mobile device 150 to initiate an audio and video chat with first mobile device 120. The confirmation can be transmitted by second video chat application 151 in response to a second user of second mobile device 150 accepting the request from first mobile device 120.

In 408, video chat system 104 enables first and second mobile devices 120 and 150 to transmit audio, and video data to one another using the first video chat application 130 of first mobile device 120 and second video chat application 151 of second mobile device 150. First microphone 124 of first mobile device 120 can capture audio data. Moreover, first camera 128 of first mobile device 120 can capture video data. First video chat application 130 of first mobile device 120 can transmit the audio data to video chat system 104. Similarly, second microphone 154 of second mobile device 150 can capture audio data.

Moreover, second camera 156 of second mobile device 150 can capture video data. Second video chat application 151 of second mobile device 150 can transmit the audio data to video chat system 104. Video chat system 104 can encode and sync the audio and video data received from first and second mobile devices 120 and 150, respectively. Video chat system 104 can transmit the encoded and synced audio and video data received from first mobile device 120 to second mobile device 150. Furthermore, video chat system 104 can transmit the encoded and synced audio and video data received from second mobile device 150 to first mobile device 120. First display 122 of first mobile device 120 can output the received video data, and a speaker of first mobile device 120 can output the received audio data. Second display 152 of second mobile device 150 can output the received video data, and a speaker of the second mobile device 150 can output the received audio data.

In 410, server 100 receives a streaming request to stream incoming audio and video data received by first mobile device 120 from second mobile device 150, on display device 132. The request can be transmitted by application 126 in response to first mobile device 120, forming a connection with rotating base 140. First mobile device 120 can form a connection with rotating base 140 via a wired or wireless connection. First mobile device 120 can be communicatively and physically coupled to rotating base 140.

In 412, streaming system 102 establishes a connection with display device 132. Streaming system 102 can transmit a request to stream audio and video data intended to be received by first mobile device 120 on display device 132. Display device 132 can include display 134, display speaker 136, and application 138. The application 138 can be used to establish a connection with streaming system 102. The connection can be established in response to application 138, confirming the connection.

In 414, streaming system 102 receives a stream of incoming audio and video data transmitted by second mobile device 150 to first mobile device 120. Streaming system 102 can capture the audio and video data prior to when first mobile device 120 receiving the audio and video data or after first mobile device 120 receives the audio and video data. The audio and video data can be part of the video chat between first and second mobile devices 120 and 150.

In 416, streaming system 102 formats the audio and video data transmitted by second mobile device 150 to first mobile device 120, so that the audio and video data can be streamed and output by display device 132. Streaming system 102 can format audio and video data by encoding and syncing the audio and video data. Furthermore, streaming system 102 can format the audio and video data so the audio and video data can be transmitted to display device 132 via a streaming protocol.

In operation 418, streaming system 102 streams the incoming formatted audio and video data to display device 132. Application 138 can receive the audio and video data. Application 138 can further format the audio and video data. For example, the audio data can be formatted so that the audio data can be output using display speaker 136. Furthermore, application 138 can format the video data so that display device 132 can output video data using display 134. Formatting can include resizing the video data, adjusting the resolution, color, brightness, or the like. Display speaker 136 can output the audio data and display 134 can output video data. This way, the first user can view the video chat on display 134 and listen to the audio of the video chat using display speaker 136.

Figure 5:
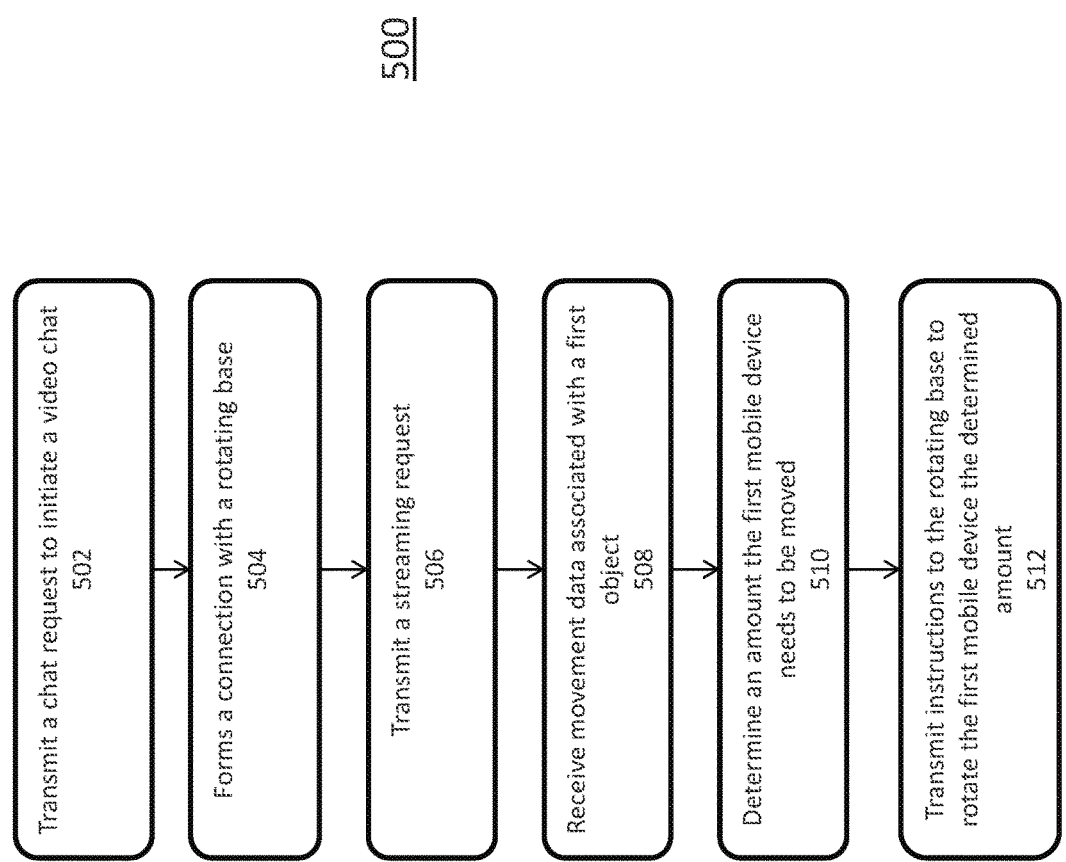
FIG. 5 is a flowchart illustrating a converting data tracking a user within the field of view of a camera of the mobile device, according to some embodiments.

FIG. 5 is a flowchart illustrating a converting data tracking a user within the field of view of a camera of the mobile device. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, first video chat application 130 of first mobile device 120 transmits a chat request to initiate a video chat with second mobile device 150 to server 100. The request can include an identifier of second mobile device 150. Video chat system 104 can transmit a request to second mobile device 150 to initiate a video chat with first mobile device 120. Second mobile device 150 can transmit a confirmation to initiate the video chat with first mobile device 120 to server 100. In response to receiving a confirmation from second mobile device 150, video chat system 104 can enable video and audio transmissions between first and second mobile device 120 and 150.

In 504, application 126 forms a connection with rotating base 140. Application 126 can form a wired or wireless connection with rotating base 140. In response to forming the connection, application 126 can communicate with rotating base 140. Rotating base 140 can include communication device 142, motor 144, and controller 146. Application 126 can form a connection with first mobile device 120 using communication device 142. Furthermore, first mobile device 120 can be physically coupled with rotating base 140.

In 506, application 126 transmits a streaming request to stream incoming audio and video data of the video chat received by first mobile device 120 on display device 132 in response to forming a connection with rotating base 140. The streaming request can be transmitted to server. 100. Video chat system 104 can establish a connection with display device 132 in response to receiving the streaming request. In response to establishing a connection with display device 132, streaming system 102 can stream audio and video data received by first mobile device 120 from second mobile device 150 as part of the video chat to display device 132. Display device 132 can output the audio and video data.

In 508, application 126 receives or calculates movement data associated with a first object, indicating movement of an object within the field of view of first camera 128. Application 126 can use a real-time computer vision application to track the object. Alternatively, sensors 129 can be optical sensors configured to detect movement of objects in the field of view of first camera 128. The movement data can include an identifier associated with the object that moved and the amount of movement. The object can be the first user. Application 126 can also use image recognition algorithms to identify the first object amongst multiple objects in a given area.

In 510, application 126 determines an amount first mobile device 120 needs to be moved to maintain the object within the field of view of first camera 128. Application 126 can determine how much the mobile device needs to be moved based on the amount of movement of the object.

In 512, application 126 transmits instructions to rotating base 140 to rotate first mobile device 120 the determined amount. As described above, first mobile device 120 can be physically coupled to rotating base 140. In particular, a coupling unit of rotating base 140 can be configured to hold, support and also power the first mobile device 120. Rotating base 140 may act as a power supply to first mobile device 120 so that first mobile device is configured to operate for longer periods of time. The power may be provided through the coupling unit or wirelessly. The coupling unit can be coupled to a rotatable unit. The rotatable unit can be coupled to motor 144, and motor 144 can be coupled to controller 146. Controller 146 can receive instructions from application 126. Controller 146 can instruct motor 144 to move the rotatable unit the determined amount. As a result, the coupling unit and first mobile device 120 can also move a determined amount.

Figure 6:
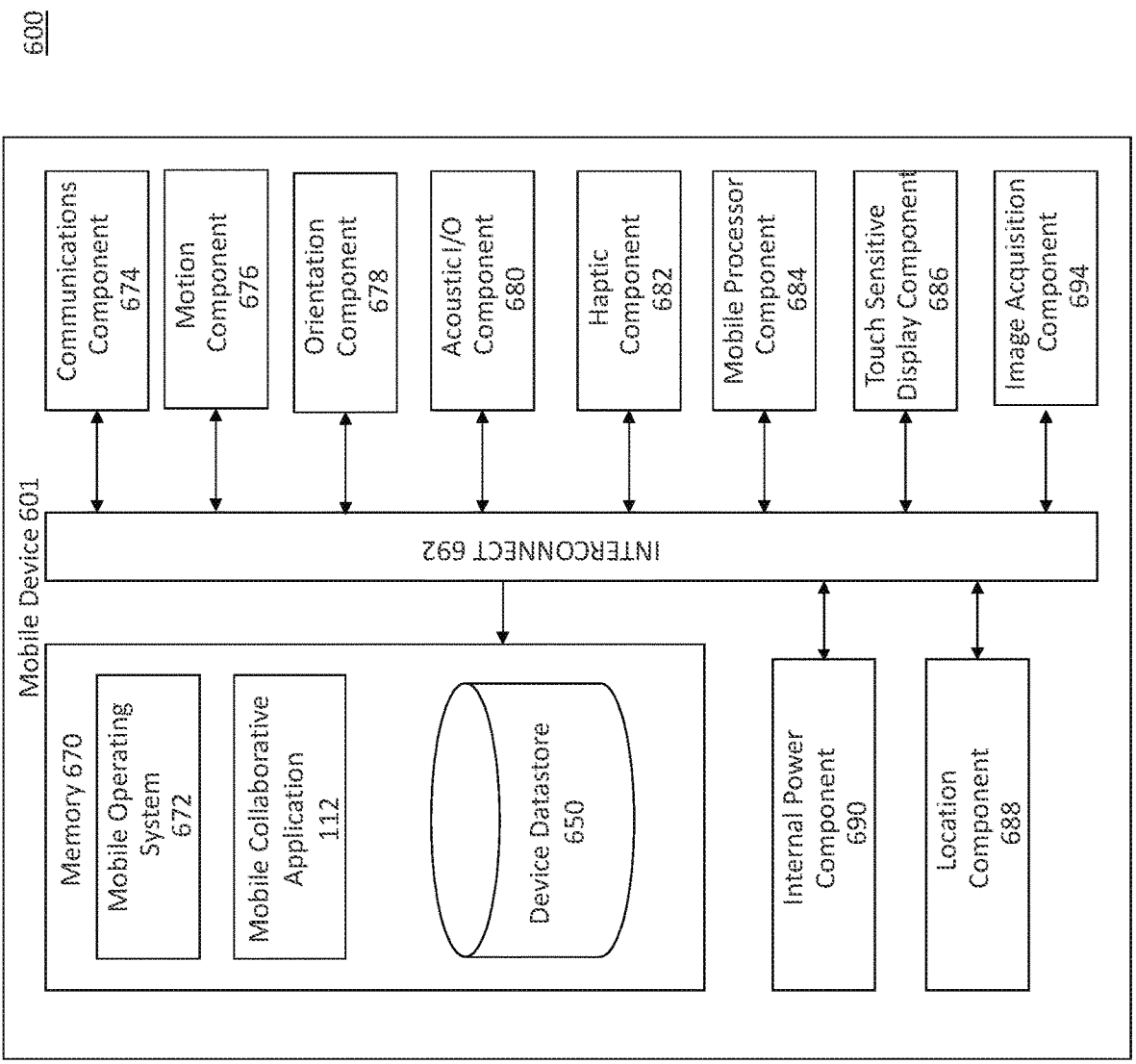
FIG. 6 is a block diagram of example components of a mobile device according to some embodiments.

FIG. 6 illustrates an example block diagram 600 of an example embodiment of the mobile device 601. Mobile device 601 may be an embodiment of first and/or second mobile device 120 and 150. Mobile device 601 (e.g., a mobile phone, tablet, laptop, etc.) may be generally configured to enable or allow users to conduct video chats. It is to be appreciated that while FIG. 6 illustrates one example embodiment of mobile device 601, the example embodiment is not limited to this context.

In one embodiment, mobile device 601 may be generally arranged to provide mobile computing and/or mobile communications and may include, but are not limited to, memory 670, communications component 674, motion component 676, and orientation component 678, acoustic input/output component 680, haptic component 682, mobile processor component 684, touch-sensitive display component 686, location component 688, internal power component 690, and image acquisition component 894, where each of the components and memory 670 may be operatively connected via interconnect 692.

In one embodiment, the memory 670 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In one embodiment, the memory 670 may include instruction information arranged for execution by the mobile processor component 684. In that embodiment, the instruction information may be representative of at least one operating system 672, one or more applications, which may include, but are not limited to, first video chat application 130, second video chat application 151, and application 126. In an embodiment, the memory 670 may further include device datastore 650 which may be configured to store information.

In one embodiment, the mobile operating system 672 may include, without limitation, mobile operating systems (e.g., Apple® iOS®, Google® Android®, Microsoft® Windows Phone®, Microsoft® Windows®, etc.) generally arranged to manage hardware resources (e.g., one or more components of mobile device 601, etc.) and/or software resources (e.g., one or more applications of the first and second mobile device 120 and 150, etc.).

In one embodiment, the communications component 674 may be generally arranged to enable mobile device 601 to communicate, directly and/or indirectly, with various devices and systems. The communications component 674 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In one embodiment, the mobile processor component 684 may be generally arranged to execute instruction information, which may generally include one or more executable and/or interpretable instructions. In an embodiment, the processor component 684 may be a mobile processor component or system-on-chip (SoC) processor component. The processor component 684, may comprise, among other elements, processor circuit, which may further include, but is not limited to, at least one set of electronic circuits arranged to execute one or more instructions. Examples of mobile processor components 684 may include, but is not limited to, Qualcomm® Snapdragon®, NVidia® Tegra®, Intel® Atom®, Samsung® Exynos, Apple® A7®-A13®, or any other type of mobile processor(s) arranged to execute the instruction information including the one or more instructions stored in memory 670.

In one embodiment, the touch sensitive display component 686 may be generally arranged to receive and present visual display information and provide touch input information based on detected touch based or contact based input. Moreover, the touch sensitive display component 686 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 668 to detect and/or receive touch or contact based input information associated with the display device of the first and second mobile device 120 and 150. Additionally, the touch sensor(s) may be integrated with the surface of the display device, so that a user's touch or contact input may substantially correspond to the presented visual display information on the display device, such as, for example, one or more user interface (UI) views and elements discussed and illustrated herein.

In one embodiment, the location component 688 may be generally arranged to receive positioning signals representative of positioning information and provide location information (e.g., approximate physical location of the first and second mobile device 120 and 150) determined based at least partially on the received positioning information. Moreover, the location component 688 may include, among other elements, positioning circuit (e.g., a global positioning system (GPS) receiver, etc.) arranged to determine the physical location of the mobile device 601. In some embodiments, the location component 688 may be further arranged to communicate and/or interface with the communications component 674 in order to provide greater accuracy and/or faster determination of the location information.

In one embodiment, the internal power component 690 may be generally arranged to provide power to the various components and the memory of the first and second mobile device 120 and 150. In one embodiment, the internal power component 690 may include and/or be operatively coupled to an internal and/or external battery configured to provide power to the various components (e.g., communications component 674, motion component 676, memory 670, etc.). The internal power component 690 may also be operatively coupled to an external charger to charge the battery.

Various embodiments can be implemented, for example, using one or more computer systems, such as computer system 700 shown in FIG. 7. Computer system 700 can be used, for example, to implement method 400 of FIG. 4, 500 of FIG. 5. Furthermore, computer system 700 can be at least part of server 100, as shown in FIG. 1. For example, computer system 700 can stream audio and video data of a video chat to display device 132 from first mobile device 120. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc. In some embodiments, computer system may also include specialized processors for implementing machine learning or artificial intelligence algorithms. For example, processors such as Intel® Neural Compute Stick, field programmable gate arrays (FPGA), Intel® Movidius Vision, Tesla® AI chip, or the like.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method comprising:
receiving, by one or more computing devices, a streaming request to stream incoming audio data and video data received by a first mobile device from a second mobile device on a display device, from the first mobile device;
streaming the incoming audio data and the incoming video data to the display device;
capturing an identifier of an object from outgoing audio data captured by a microphone of the first mobile device, wherein the object is located within a proximate distance of the first mobile device and the outgoing audio data including the identifier is output by a different object;
identifying the object within the proximate distance of the first mobile device in outgoing video data captured by a camera of the first mobile device based on the identifier; and
instructing the camera of the first mobile device to include the object in a field of view of the camera of the first mobile device.

2. The method of claim 1, further comprising:
receiving a chat request to initiate an audio and video chat with the second mobile device; and
enabling audio and video communication between the first and second mobile devices, wherein the audio and video communication include the incoming audio data and video data.

3. The method of claim 2, further comprising:
causing the camera and the microphone of the first mobile device to become operational in response to enabling the audio and video communication between the first and second mobile devices.

4. The method of claim 3, further comprising:
capturing the outgoing audio data and the outgoing video data received by the microphone and the camera of the first mobile device; and
transmitting the outgoing audio data and the outgoing video data to the second mobile device.

5. The method of claim 1, wherein the incoming audio data and the incoming video data are formatted based on a streaming protocol associated with the display device.

6. The method of claim 1, wherein the incoming audio data and the incoming video data are reformatted by the display device.

7. The method of claim 1, wherein receiving the streaming request is performed in response to the first mobile device coupling with a rotating base.

8. The method of claim 7, wherein the rotating base is configured to provide power to the first mobile device in response to the first mobile device coupling with the rotating base.

9. The method of claim 1, further comprising causing display of image data of a first display of the first mobile device on the second mobile device when in a screen sharing mode.

10. A system comprising:
a camera;
a microphone; and
a first mobile device coupled to the camera and the microphone, the first mobile device configured to execute an application, the application, when executed, configured to:
transmit a chat request for initiating an audio and video chat with a second mobile device, wherein initiation of the audio and video chat enables the first mobile device to transmit and receive audio and video communication to and from the second mobile device;
transmit a streaming request to stream incoming audio data and video data received by the first mobile device from the second mobile device to a display device, in response to establishing a connection with a rotating base;

capture an identifier of an object from outgoing audio data captured by the microphone, wherein the object is located within a proximate distance of the first mobile device and the outgoing audio data including the identifier is output by a different object;

identify the object within the proximate distance of the first mobile device in outgoing video data captured by the camera based on the identifier;

instruct the camera to include the object in a field of view of the camera; and transmit the outgoing audio data and the outgoing video data to the second mobile device.

11. The system of claim 10, wherein the camera and the microphone become operational in response to transmitting the chat request.

12. The system of claim 10, wherein the first mobile device is coupled physically and communicatively to the rotating base.

13. The system of claim 10, the application further configured to:

detect movement of a new object in the field of view of the camera;

transmit instructions to the rotating base to move the first mobile device a predetermined amount based on the movement of the new object such that the object is in a desired location in the field of view of the camera.

14. The system of claim 13, the application further configured to control pan, crop or zoom operations of the camera based on a location of the new object with respect to the camera.

15. The system of claim 10, wherein the connection between the first mobile device and the rotating base is established in response to forming a wired connection with a data port of the first mobile device and the rotating base.

16. The system of claim 10, wherein the rotating base is configured to provide power to the first mobile device in response to the first mobile device coupling with the rotating base.

17. The system of claim 10, wherein image data of a first display of the first mobile device is displayed on the second mobile device when in a screen sharing mode.

18. A rotating base comprising:
a motor;
a communications device;
a rotatable unit coupled to the motor;
a coupling unit coupled to the rotatable unit; and
a controller coupled to the motor and the communications device, the controller configured to:
receive a mobile device in the coupling unit, wherein the mobile device is communicatively coupled to the rotating base using the communications device and physically coupled to the rotating base using the coupling unit;
receive instructions to move the rotatable unit a predetermined amount from an application executing on the mobile device in response to the application capturing an identifier of an object located within a proximate distance of the mobile device from outgoing audio data captured by a microphone of the mobile device, wherein the application identifies the object within the proximate distance of the mobile device in outgoing video data captured by a camera of the mobile device based on the identifier and the outgoing audio data including the identifier is output by a different object; and
instruct the motor to rotate the rotatable unit the predetermined amount such that the object is within a field of view of the camera of the mobile device, wherein rotating the rotatable unit causes the coupling unit, which is physically coupled to the mobile device, to rotate the predetermined amount.

19. The rotating base of claim 18, wherein the rotatable unit is configured to rotate about a rotational axis.

20. The rotating base of claim 18, wherein the rotatable unit is configured to traverse along an x-axis, y-axis, and z-axis.

21. The rotating base of claim 18, wherein the mobile device is coupled to the coupling unit using an attachment mechanism of the coupling unit.

22. The rotating base of claim 18, wherein the communications device is communicatively coupled to the mobile device through a wired connection with a data port of the mobile device.

23. The rotating base of claim 18, wherein the communications device is wirelessly communicatively coupled to the mobile device.

24. The rotating base of claim 18, wherein the rotating base is configured to provide power to the first mobile device in response to the first mobile device coupling with the rotating base.

25. The rotating base of claim 18, wherein image data of a first display of the first mobile device is displayed on the second mobile device when in a screen sharing mode.

26. A non-transitory computer-readable medium having instructions stored thereon that, when executed by at least one computing device, cause the at least one computing device to perform operations comprising:

receiving a streaming request to stream incoming audio data and video data received by a first mobile device from a second mobile device on a display device, from the first mobile device;

streaming the incoming audio and the incoming video data to the display device;

capturing an identifier of an object from outgoing audio data captured by a microphone of the first mobile device, wherein the object is located within a proximate distance of the first mobile device and the outgoing audio data including the identifier is output by a different object;

identifying the object within the proximate distance of the first mobile device in outgoing video data captured by a camera of the first mobile device based on the identifier; and instructing the camera of the first mobile device to include the object in a field of view of the camera of the first mobile device.

27. The non-transitory computer-readable medium of claim 26, wherein a rotating base is configured to provide power to the first mobile device in response to the first mobile device coupling with the rotating base.

28. The non-transitory computer-readable medium of claim 26, wherein image data of a first display of the first mobile device is displayed on the second mobile device when in a screen sharing mode.

* * * * *